(12) United States Patent
Gottschalk-Gaudig et al.

(10) Patent No.: US 8,361,622 B2
(45) Date of Patent: Jan. 29, 2013

(54) HIGHLY DISPERSE METAL OXIDES HAVING A HIGH POSITIVE SURFACE CHARGE

(75) Inventors: Torsten Gottschalk-Gaudig, Mehring (DE); Ute Volkel, Burghausen (DE)

(73) Assignee: Wacker Chemie AG, Munich (DE)

( * ) Notice: Subject to any disclaimer, the term of this patent is extended or adjusted under 35 U.S.C. 154(b) by 350 days.

(21) Appl. No.: 12/669,301

(22) PCT Filed: Jul. 10, 2008

(86) PCT No.: PCT/EP2008/059020
§ 371 (c)(1),
(2), (4) Date: Jan. 15, 2010

(87) PCT Pub. No.: WO2009/010447
PCT Pub. Date: Jan. 22, 2009

(65) Prior Publication Data
US 2010/0196811 A1   Aug. 5, 2010

(30) Foreign Application Priority Data

Jul. 18, 2007   (DE) .......................... 10 2007 033 448

(51) Int. Cl.
*C08K 9/06* (2006.01)
(52) U.S. Cl. ........................................ 428/405; 523/213
(58) Field of Classification Search .................. 428/405; 523/212
See application file for complete search history.

(56) References Cited

U.S. PATENT DOCUMENTS

| | | | |
|---|---|---|---|
| 4,618,556 A | 10/1986 | Takenouchi et al. | |
| 4,902,570 A | 2/1990 | Heinemann et al. | |
| 4,973,540 A | 11/1990 | Machida et al. | |
| 5,102,763 A * | 4/1992 | Winnik et al. | 430/108.24 |
| 5,384,194 A | 1/1995 | Deusser et al. | |
| 5,419,928 A | 5/1995 | Deusser et al. | |
| 5,486,420 A * | 1/1996 | Nishihara et al. | 428/405 |
| 5,501,933 A | 3/1996 | Deusser et al. | |
| 5,665,511 A | 9/1997 | Imai et al. | |
| 5,686,054 A | 11/1997 | Barthel et al. | |
| 5,851,715 A | 12/1998 | Barthel et al. | |
| 5,985,953 A * | 11/1999 | Lightsey et al. | 523/212 |
| 6,203,960 B1 * | 3/2001 | Ciccarelli et al. | 430/108.7 |
| 6,342,560 B1 * | 1/2002 | Okel | 524/493 |
| 7,687,107 B2 * | 3/2010 | Okel et al. | 427/212 |
| 7,704,552 B2 * | 4/2010 | Okel et al. | 427/212 |
| 2004/0220419 A1 | 11/2004 | Gottschalk-Gaudig et al. | |

FOREIGN PATENT DOCUMENTS

| | | |
|---|---|---|
| DE | 3330380 A1 | 2/1984 |
| DE | 3707226 A1 | 9/1988 |
| DE | 4202694 C1 | 7/1993 |
| EP | 0609870 A1 | 8/1994 |
| EP | 0716350 A2 | 6/1996 |
| EP | 0686676 B1 | 8/1998 |
| EP | 1138724 A2 | 10/2001 |
| EP | 1473296 A1 | 11/2004 |
| GB | 2144555 A | 3/1985 |

OTHER PUBLICATIONS

G.W. Sears, Anal Chem. 1856, 28, 1981.
F. Saint-Michel, F. Pignon, A. Magnin, J. Colloid Interface Sci. 2003, 267, 314.
D. W. Sindorf, G.E. Maciel, Journal of the American Chemical Society 1983, 105. 3767.
Kovalchuk et al., Preparation, structure and thermal stability of onium- and amino-functionalized silicas for the use as catalysts supports, Journal of Colloid and Interface Science, Academice Press, New York, NY, US, vol. 302, No. 1, Oct. 1, 2006, pp. 214-229.
Zhang et al., Chemical fixation of carbon Dioxide to propylebe carbonate over amine-functionalized silica catalysts, Catalysts Today, Elsevier, vol. 115, No. 1-4 Jun. 30, 2006, pp. 102-106.
Davis et al., Anakysis of surface silylation reactions by Raman spectroscopy, Applied Surface Science, Elsevier, Amsterdam, NL, vol. 72, No. 4, Dec. 1, 1993, pp. 419-426.

* cited by examiner

*Primary Examiner* — Margaret Moore
(74) *Attorney, Agent, or Firm* — Brooks Kushman P.C.

(57) ABSTRACT

Metal oxides are modified by aminohydrocarbyl-substituted monoalkyltrisiloxy groups in a defined percentage of $T_1$ and $T_2$ groups relative to total T groups wherein the T groups denote connectivity of siloxy bonds to the metal oxide have a high positive triboelectric chargeability, the triboelectric charge being stable even in conditions of high humidity.

15 Claims, No Drawings

HIGHLY DISPERSE METAL OXIDES HAVING A HIGH POSITIVE SURFACE CHARGE

CROSS-REFERENCE TO RELATED APPLICATION

This application is the U.S. national phase of PCT Appln. No. PCT/EP2008/059020 filed Jul. 10, 2008 which claims priority to German application DE 10 2007 033 448.8 filed Jul. 18, 2007.

BACKGROUND OF THE INVENTION

1. Field of the Invention

The invention relates to metal oxides which have a high positive surface charge and the preparation and use thereof.

2. Description of the Related Art

The surface charge properties of particulate metal oxides are important properties when these substances are used for controlling the flow properties and triboelectric charge in toners, developers and powder coats.

Particulate metal oxides having electrostatically positive chargeability are used in particular as constituents of developers and toners for visualization of negative electrostatic charge images. A precondition is high, stable, uniform positive triboelectric chargeability of the particles.

Particulate metal oxides having electrostatically positive chargeability are used in particular as constituents of powder coats for controlling the charging in the triboelectric application of powder coats. A precondition is again, high, stable, uniform positive triboelectric chargeability of the particles.

Particulate metal oxides having electrostatically negative chargeability are used in particular as constituents of developers and toners for visualization of positive electrostatic charge images. A precondition is high, stable, uniform negative triboelectric chargeability of the particles.

Particulate metal oxides having electrostatically negative chargeability are used in particular as constituents of powder coats for controlling the powder flow properties in the application by means of the corona process.

The sign, the magnitude and the density of the surface charge of particulate metal oxides are decisively determined by the chemical structure of the particle surface. In the case of metal oxides, such as silicon dioxides, aluminum oxides or titanium dioxides, surface hydroxyl groups are the charge-determining groups, the acid strength of the metal-hydroxyl groups decisively influencing the sign of the charge and the surface charge density. Thus, unmodified silicas or metal oxides modified with alkylsilyloxy groups are particles which can be triboelectrically charged to have a negative charge.

For producing positive triboelectric charges, as described, for example, in DE 33 30 380, aminosilanes can be chemically fixed on the particle surface. However, the positive triboelectric charge build-ups achieved with particles modified in this manner tend to have a low magnitude and are greatly dependent on the ambient conditions, such as the atmospheric humidity.

More stable triboelectric charging can be achieved by additional hydrophobization of the particles, as described, for example, in DE 33 30 380 or DE 37 07 226. However, in these cases too, the magnitude of the positive triboelectric charge build-up is frequently small.

SUMMARY OF THE INVENTION

It was an object of the invention to overcome the disadvantages of the prior art and in particular to provide particulate metal oxides which have high positive and stable triboelectric charge build-up.

These and other objects are achieved by the invention, in which metal oxides are modified by aminohydrocarbyl-substituted monoalkyltrisiloxy groups in a defined percentage of $T_1$ and $T_2$ groups relative to total T groups.

DETAILED DESCRIPTION OF THE PREFERRED EMBODIMENTS

The invention relates to metal oxides which are modified with groups of the general formula (I)

$$—O_{1+n}—Si(OR^1)_{2-n}—R^2—NR^3{}_2 \quad (I)$$

in which
n may be 0, 1, 2, in which
$R^1$ may be a hydrogen atom or a C—O-bonded $C_1$-$C_{15}$-hydrocarbon radical, or an acetyl radical,
$R^2$ may be an Si—C-bonded $C_1$-$C_{20}$-hydrocarbon radical or an aryl radical, or a $C_1$-$C_{15}$-hydrocarbon-oxy radical in which in each case one or more, non-neighboring methylene units may be replaced by groups —O—, —CO—, —COO—, —OCO— or —OCOO—, —S— or —NR$^3$— and in which one or more non-neighboring methine units may be replaced by groups —N=, —N=N— or —P=,
$R^3$ may be a hydrogen atom or an optionally mono- or polyunsaturated N—C-bonded, monovalent, optionally divalent, $C_2$-$C_{20}$-hydrocarbon radical optionally substituted by —CN, —NCO, —NR$^4{}_2$, —COOH, —COOR$^4$, -halogen, -acryloyl, -epoxy, —SH, —OH or —CONR$^4{}_2$, or an aryl radical, or a $C_2$-$C_{25}$-hydrocarbon-oxy radical in which in each case one or more, non-neighboring methylene units may be replaced by groups —O—, —CO—, —COO—, —OCO— or —OCOO—, —S— or —NR$^4$— and in which one or more, non-neighboring methine units may be replaced by groups —N=, —N=N— or —P=, it being possible for $R^3$ to be identical or different or for the amine group —N(R$^3$)$_2$ also to be part of an aliphatic or aromatic heterocycle,
$R^4$ has the same meaning as $R^1$ and $R^4$ may be identical or different, the proportion of the sum of the NMR signal intensities of the $T^1$ and $T^2$ groups, based on the total intensity of the T groups $T^1+T^2+T^3$, being at least 20%, the T groups being defined as $T^1$: R—Si(OR$^1$)$_2$—O—Si $T^2$: R—Si(OR$^1$)(—O—Si)$_2$ $T^3$: R—Si(—O—Si)$_3$, R being an organic group and $R^1$ being as defined above or it being possible for $R^1$ to be a hydrogen atom.

It was surprising and by no means foreseeable for the person skilled in the art that, by controlling the ratio of the $T^1$:$T^2$:$T^3$ groups of the charge-determining aminosilanes, high positive triboelectric charge build-ups can be obtained. A T group is understood as meaning a monoalkyltrisilyloxy group R—Si(O—)$_2$, the superscript representing the number of siloxane bonds, i.e.

$T^1$: R—Si(OR')$_2$—O—Si $T^2$: R—Si(OR')(—O—Si)$_2$ $T^3$: R—Si(—O—Si)$_3$, it being possible for R' to be an alkyl group or hydrogen atom.

The metal oxides according to the invention are modified with groups of the general formula (I)

$$—O_{1+n}—Si(OR^1)_{2-n}—R^2—NR^3{}_2 \quad (I)$$

in which n may be 0, 1, 2, in which $R^1$ may be a hydrogen atom or a C—O-bonded $C_1$-$C_{15}$-hydrocarbon radical, preferably a $C_1$-$C_8$-hydrocarbon radical, particularly preferably a $C_1$-$C_3$-hydrocarbon radical, or an acetyl radical, $R^2$ may be an Si—C-bonded $C_1$-$C_{20}$-hydrocarbon radical, preferably a $C_1$-$C_8$-hydrocarbon radical, particularly preferably a $C_1$-$C_3$-hydrocarbon radical, or an aryl radical, or a $C_1$-$C_{15}$-hydrocarbon-oxy radical, preferably a $C_1$-$C_8$-hydrocarbon-oxy radical, particularly preferably a $C_1$-$C_4$-hydrocarbon-oxy radical, in which in each case one or more, non-neighboring methylene units may be replaced by groups —O—, —CO—, —COO—, —OCO— or —OCOO—, —S— or —$NR^3$— and in which one or more, non-neighboring methine units can be replaced by groups N≡, —N═N— or —P═, $R^3$ may be a hydrogen atom or an optionally mono- or polyunsaturated N—C-bonded, monovalent, optionally divalent, $C_1$-$C_{20}$-hydrocarbon radical which is optionally substituted by —CN, —NCO, —$NR^4_2$, —COOH, —$COOR^4$, -halogen, -acryloyl, -epoxy, —SH, —OH or —$CONR^4_2$, preferably a $C_1$-$C_8$-hydrocarbon radical, particularly preferably a $C_1$-$C_3$-hydrocarbon radical, or an aryl radical, or a $C_1$-$C_{15}$-hydrocarbon-oxy radical, preferably a $C_1$-$C_8$-hydrocarbon-oxy radical, particularly preferably a $C_1$-$C_4$-hydrocarbon-oxy radical, in which in each case one or more, non-neighboring methylene units may be replaced by groups —O—, —CO—, —COO—, —OCO— or —OCOO—, —S— or —$NR^4$— and in which one or more, non-neighboring methine units may be replaced by groups —N═, —N═N— or —P═, it being possible for $R^3$ to be identical or different or for the amine group —$N(R^3)_2$ also to be part of an aliphatic or aromatic heterocycle, such as, for example, a pyridine radical, an N-alkylimidazole radical, such as an N-methylimidazole radical, an N-alkylmorpholine radical, such as N-methylmorpholine radical, $R^4$ has the same meaning as $R^1$ and $R^4$ may be identical or different.

Preferred groups $R^1$ are the hydrogen atom, and alkyl groups such as the methyl group, ethyl group and propyl groups such as the n-propyl and isopropyl groups, hexyl groups such as the n-hexyl or isohexyl groups, or the acetoxy group.

Preferred groups $R^2$ are the methylene group (—$CH_2$—), the ethylene group (—$C_2H_4$—), the 1,3-propyl group (—$C_3H_7$—) and the phenylene group (—$C_6H_4$—).

Preferred groups $R^3$ are the hydrogen atom, alkyl groups such as the methyl group, the ethyl group and propyl groups, such as the n-propyl and isopropyl groups, butyl groups, such as the n-butyl and isobutyl groups, pentyl groups, hexyl groups, such as the n-hexyl and isohexyl groups, octyl groups such as the n-octyl and isooctyl groups, cycloaliphatic groups such as the cyclopentyl and cyclohexyl groups, aromatic rings such as the phenyl ring, or N-substituted radicals such as the aminoethyl radical ($NH_2$—$C_2H_4$—) or the n-butylaminoethyl radical (BuNH—$C_2H_4$—).

Particularly preferred groups of the general formula (I) are (—O)$_{1+n}$Si(OCH$_3$)$_{2-n}$—CH$_2$—N(C$_2$H$_5$)$_2$ (—O)$_{1+n}$Si(OC$_2$H$_5$)$_{2-n}$—CH$_2$—N(C$_2$H$_5$)$_2$ (—O)$_{1+n}$Si(OH)$_{2-n}$—CH$_2$—N(C$_2$H$_5$)$_2$ (—O)$_{1+n}$Si(OCH$_3$)$_{2-n}$—CH$_2$—N(C$_4$H$_9$)$_2$

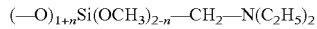

(—O)$_{1+n}$Si(OC$_2$H$_5$)$_{2-n}$—CH$_2$—N(C$_4$H$_9$)$_2$ (—O)$_{1+n}$Si(OH)$_{2-n}$—CH$_2$—N(C$_4$H$_9$)$_2$ (—O)$_{1+n}$Si(OCH$_3$)$_{2-n}$—CH$_2$—NH(C$_6$H$_5$)

(—O)$_{1+n}$Si(OC$_2$H$_5$)$_{2-n}$—CH$_2$—NH(C$_6$H$_5$)

(—O)$_{1+n}$Si(OH)$_{2-n}$—CH$_2$—NH(C$_6$H$_5$)

(—O)$_{1+n}$Si(OCH$_3$)$_{2-n}$—CH$_2$—NH(C$_6$H$_{11}$)

(—O)$_{1+n}$Si(OC$_2$H$_5$)$_{2-n}$—CH$_2$—NH(C$_6$H$_{11}$)

(—O)$_{1+n}$Si(OH)$_{2-n}$—CH$_2$—NH(C$_6$H$_{11}$)

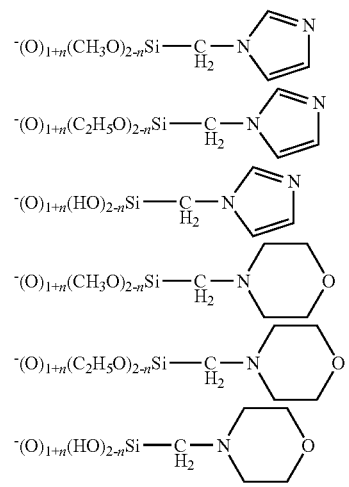

(—O)$_{1+n}$Si(OCH$_3$)$_{2-n}$—C$_3$H$_7$—NH$_2$ (—O)$_{1+n}$Si(OC$_2$H$_5$)$_{2-n}$—C$_3$H$_7$—NH$_2$ (—O)$_{1+n}$Si(OH)$_{2-n}$—C$_3$H$_7$—NH$_2$ (—O)$_{1+n}$Si(OCH$_3$)$_{2-n}$—C$_3$H$_7$—NH(CH$_3$)

(—O)$_{1+n}$Si(OC$_2$H$_5$)$_{2-n}$—C$_3$H$_7$—NH(CH$_3$)

(—O)$_{1+n}$Si(OH)$_{2-n}$—C$_3$H$_7$—NH(CH$_3$)

(—O)$_{1+n}$Si(OCH$_3$)$_{2-n}$—C$_3$H$_7$—N(CH$_3$)$_2$ (—O)$_{1+n}$Si(OC$_2$H$_5$)$_{2-n}$—C$_3$H$_7$—N(CH$_3$)$_2$ (—O)$_{1+n}$Si(OH)$_{2-n}$—C$_3$H$_7$—N(CH$_3$)$_2$ (—O)$_{1+n}$Si(OCH$_3$)$_{2-n}$—C$_3$H$_7$—NH(C$_2$H$_5$)

(—O)$_{1+n}$Si(OC$_2$H$_5$)$_{2-n}$—C$_3$H$_7$—NH(C$_2$H$_5$)

(—O)$_{1+n}$Si(OH)$_{2-n}$—C$_3$H$_7$—NH(C$_2$H$_5$)

(—O)$_{1+n}$Si(OCH$_3$)$_{2-n}$—C$_3$H$_7$—N(C$_2$H$_5$)$_2$ (—O)$_{1+n}$Si(OC$_2$H$_5$)$_{2-n}$—C$_3$H$_7$—N(C$_2$H$_5$)$_2$ (—O)$_{1+n}$Si(OH)$_{2-n}$—C$_3$H$_7$—N(C$_2$H$_5$)$_2$ (—O)$_{1+n}$Si(OCH$_3$)$_{2-n}$—C$_3$H$_7$—NH(C$_6$H$_{11}$)

(—O)$_{1+n}$Si(OC$_2$H$_5$)$_{2-n}$—C$_3$H$_7$—NH(C$_6$H$_{11}$)

(—O)$_{1+n}$Si(OH)$_{2-n}$—C$_3$H$_7$—NH(C$_6$H$_{11}$)

$(-O)_{1+n}Si(OCH_3)_{2-n}-C_3H_7-NH(C_6H_5)$ $(-O)_{1+n}Si(OC_2H_5)_{2-n}-C_3H_7-NH(C_6H_5)$ $(-O)_{1+n}Si(OH)_{2-n}-C_3H_7-NH(C_6H_5)$ $(-O)_{1+n}Si(OCH_3)_{2-n}-C_3H_7-NH(C_4H_9)$ $(-O)_{1+n}Si(OC_2H_5)_{2-n}-C_3H_7-NH(C_4H_9)$ $(-O)_{1+n}Si(OH)_{2-n}-C_3H_7-NH(C_4H_9)$ $(-O)_{1+n}Si(OCH_3)_{2-n}-C_3H_7-N(C_4H_9)_2$ $(-O)_{1+n}Si(OC_2H_5)_{2-n}-C_3H_7-N(C_4H_9)_2$ $(-O)_{1+n}Si(OH)_{2-n}-C_3H_7-N(C_4H_9)_2$ $(-O)_{1+n}Si(OCH_3)_{2-n}-C_3H_7-NH(C_2H_4)NH_2$ $(-O)_{1+n}Si(OC_2H_5)_{2-n}-C_3H_7-NH(C_2H_4)NH_2$ $(-O)_{1+n}Si(OH)_{2-n}-C_3H_7-NH(C_2H_4)NH_2$

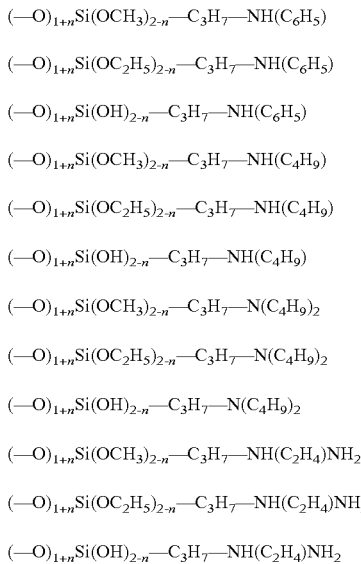

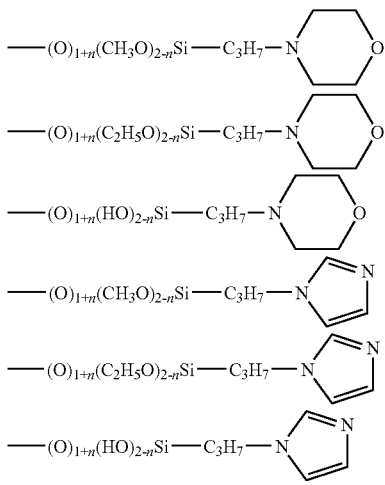

in which n has the abovementioned meaning.

A further subject is a process for modifying the metal oxides, characterized in that the metal oxides are modified under anhydrous conditions with organosilanes of the general formula II $$X_{1+n}Si(OR^1)_{2-n}-R^2-NR^3_2 \quad (II)$$

in which $R^1$, $R^2$, $R^3$, $R^4$ and n have the above-mentioned meaning, $R^1$ and $R^4$ may be identical and X is halogen, a nitrogen radical, $OR^4$, $OCOR^4$, or $O(CH_2)_xOR^4$ and x is 1, 2, or 3.

The modification of the silica with groups of the general formula I can be effected according to known processes, as described, for example, in EP 686 676 B1, with organosilanes of the general formula II $$X_{1+n}Si(OR^1)_{2-n}-R^2-NR^3_2 \quad (II)$$

in which $R^1$, $R^2$, $R^3$, $R^4$ and n have the abovementioned meaning, $R^1$ and $R^4$ may be identical and X is halogen, a nitrogen radical, $OR^4$, $OCOR^4$, or $O(CH_2)_xOR^4$ and x is 1, 2, or 3.

In addition to groups of the general formula I, the metal oxides according to the invention are preferably modified with further groups of the general formula III $$R^5_aSiR^6_bO_c- \quad (III)$$

in which
a may be 1, 2, 3,
b may be 0, 1, 2,
c may be 1, 2, 3 and
a+b+c=4, in which
$R^5$ may be a monovalent, optionally mono- or polyunsaturated, optionally branched hydrocarbon radical having 1 to 24 C atoms,
$R^6$ may be a likewise monovalent, optionally mono- or polyunsaturated, optionally branched hydrocarbon radical having 1 to 20 C atoms.

Radicals $R^5$ are preferably alkyl radicals such as methyl, ethyl, propyl, hexyl such as n-hexyl or isohexyl, octyl such as n-octyl or isooctyl, n-dodecyl, n-hexadecyl or n-octadecyl radicals.

Radicals $R^6$ are preferably alkyl radicals such as methyl, ethyl or propyl radicals.

Preferred groups of the general formula III on the silica surface are trimethylsilyloxy-$(CH_3)_3Si(O-)$, dimethylsilyldioxy-$(CH_3)_2Si(O-)_2$, n-propylsilyltrioxy-$C_3H_7Si(O-)_3$, n-octylsilyltrioxy-$C_8H_{17}Si(O-)_3$, i-octylsilyltrioxy-$C_8H_{17}Si(O-)_3$, n-octylmethylsilyldioxy-$C_8H_{17}SiCH_3(O-)_2$, i-octylmethylsilyl-dioxy-$C_8H_{17}SiCH_3(O-)_2$, n-hexadecylsilyltrioxy-$C_{16}H_{33}Si(O-)_3$, n-hexadecylmethylsilyldioxy-$C_{16}H_{33}SiCH_3(O-)_2$, n-dodecylsilyltrioxy-$C_{18}H_{37}Si(O-)_3$. The trimethylsilyloxy group $(CH_3)_3Si(O-)_3$ and the dimethylsilyldioxy group $(CH_3)_2Si(O-)_2$ are very particularly preferred.

The modification of the metal oxides with groups of the general formula III can be effected according to known processes, as described, for example, in EP 686 676 B1, with organosilanes of the general formula IV $$R^5_aSiR^6_bX_c \quad (IV)$$

in which $R^4$, $R^5$, $R^6$, a, b, c have the abovementioned meaning and X is halogen, a nitrogen radical, $OR^4$, $OCOR^4$, or $O(CH_2)_xOR^4$ and x is 1, 2, or 3. Methyltrichlorosilane, dimethyldichlorosilane, trimethylchlorosilane, methyltrimethoxysilane, dimethyldimethoxysilane, trimethylmethoxysilane or hexamethyldisilazane is preferred.

For the surface modification with groups of the general formula III, it is furthermore possible to use organosiloxanes composed of units of the formula $$(R^5_3SiO_{1/2}), \text{ and/or}$$

$$(R^5_2SiO_{2/2}), \text{ and/or}$$

$$(R^5SiO_{3/2}),$$

the number of these units in an organosiloxane preferably being at least 2 and $R^5$ having the abovementioned meaning. If appropriate, the surface modification can be effected exclusively by organosiloxanes or in any desired mixtures with silanes of the general formula IV.

Examples of organosiloxanes are linear or cyclic dialkylsiloxanes having an average number of dialkylsilyloxy units greater than 3. The dialkylsiloxanes are preferably dimethylsiloxanes. Particularly preferred are linear polydimethylsiloxanes having the following terminal groups: trimethylsilyloxy, dimethylhydroxysilyloxy, dimethylchlorosilyloxy, methyldichlorosilyloxy, dimethylmethoxysilyloxy, methyldimethoxysilyloxy, dimethylethoxysilyloxy, methyldiethoxysilyloxy, dimethylacetoxysilyloxy, methyldiacetoxysilyloxy and dimethylhydroxysilyloxy groups, in particular having trimethylsilyloxy or dimethylhydroxysilyloxy terminal groups.

The polydimethylsiloxanes preferably have a viscosity at 25° C. of from 2 to 100 mPa·s.

Further examples of organosiloxanes are silicone resins, in particular those which contain methyl groups as alkyl groups, more preferably those which contain $R^5{}_3SiO_{1/2}$ and $SiO_{4/2}$ units or those which contain $R^5SiO_{3/2}$ and optionally $R^5{}_2SiO_{2/2}$ units, $R^5$ having one of the abovementioned meanings. The silicone resins preferably have a viscosity at 25° C. of from 500 to 5000 mm²/s.

In the case of silicone resins having a viscosity of greater than 1000 mm²/s at 25° C., preferred are those which can be dissolved in a solvent which can easily be industrially handled, preferably, for example, alcohols such as methanol, ethanol, and isopropanol, ethers such as diethyl ether and tetrahydrofuran, siloxanes such as hexamethyldisiloxane, alkanes such as cyclohexane or n-octane, and aromatics such as toluene or xylene, with a concentration above 10% by weight and a viscosity of the mixture of less than 1000 mm²/s at a temperature of 25° C. and the pressure of the surrounding atmosphere.

Preferred among the solid organosiloxanes are those which dissolve in a solvent which can be handled industrially (as defined above) with a concentration greater than 10% by weight and a viscosity of the mixture of less than 1000 mm²/s at a temperature of 25° C.

Preferably, the metal oxides are (a) modified simultaneously with silanes of the general formula IV or organopolysiloxanes and silanes of the general formula II or (b) modified first with silanes of the general formula IV or organopolysiloxanes and then with silanes of the general formula II or (c) modified first with silanes of the general formula II and then with silanes of the general formula IV or organopolysiloxanes. Preferably, the metal oxides according to the invention are modified first with silanes of the general formula IV or organopolysiloxanes and then with silanes of the general formula II, it being possible to isolate the metal oxides after the modification with silanes of the general formula IV or organopolysiloxanes and then to modify them with silanes of the general formula II or to modify them, without prior isolation, with silanes of the general formula II; prior isolation is preferred.

The metal oxides premodified with groups of the general formula III preferably have a degree of modification of the surface metal OH groups, i.e. for example the silanol groups Si—OH, of from 5 to 90%, more preferably from 10 to 80% and most preferably from 20 to 75%, the degree of modification f(MOH) being defined as f(MOH)=$(n_{tot}(MOH)-n(MOH))\cdot 100\%/n_{tot}(MOH)$, in which n(MOH) is the physical amount of the surface metal OH groups per nm² after the modification and $n_{tot}$(MOH) is the physical amount of the surface metal OH groups per nm² before the modification, the physical amounts being based in each case on the specific surface area (measured by the BET method according to DIN EN ISO 9277/DIN 66132) of the hydrophilic starting metal oxide and, for pyrogenic silicas, $n_{tot}$(MOH), i.e. $n_{tot}$(SiOH), usually having the value 1.8 (nm²)$^{-1}$. The physical amount of the silanol groups can be determined, for example, by means of acid-base titration according to G. W. Sears, *Anal. Chem.* 1956, 28, 1981.

The metal oxides premodified with groups of the general formula III preferably have a carbon content of from 0.1 to 10%, preferably from 0.25 to 5%.

The solid used may be a metal oxide which has OH groups on the surface.

A solid having an average particle size of less than 1000 μm, in particular having an average primary particle size of from 5 to 100 nm, is preferably used as starting material of the surface modification. These primary particles cannot exist in isolation but may be constituents of larger aggregates and agglomerates.

Preferred solids are metal oxides, silica being particularly preferred. Preferably, the metal oxide has a specific surface area of from 0.1 to 1000 nm²/g (measured by the BET method according to DIN EN ISO 9277/DIN 66132), more preferably from 10 to 500 nm²/g.

The metal oxide may have aggregates (definition according to DIN 53206) in the diameter range of from 50 to 1000 nm, preferably from 50 to 500 nm and more preferably from 75 to 350 nm, the metal oxide having agglomerates (definition according to DIN 53206) which are composed of aggregates and which, depending on the external shear load (for example due to the measuring conditions), may have sizes of from 1 to 1000 μm. The diameter of the aggregates is determined as a hydrodynamic equivalent diameter by means of photon correlation spectroscopy.

For reasons relating to industrial handling properties, the metal oxide is preferably an oxide having a covalent bond component in the metal-oxygen bond, preferably an oxide, in the solid state of aggregation, of the main and subgroup elements, such as the 3rd main group, such as boron, aluminum, gallium or indium oxide, or the 4th main group, such as silicon dioxide, germanium dioxide or tin oxide or tin dioxide, lead oxide or lead dioxide, or an oxide of the 4th subgroup, such as titanium dioxide, zirconium oxide or hafnium oxide. Other examples are stable nickel, cobalt, iron, manganese, chromium or vanadium oxides.

Aluminum(III), titanium(IV) and silicon(IV) oxides are particularly preferred, for example, precipitated silicas or silica gels prepared by a wet chemical method, or aluminum oxides, titanium dioxides or silicon dioxides prepared in operations at elevated temperature, such as pyrogenically prepared aluminum oxides, titanium dioxides or silicon dioxides or silicas.

Particularly preferred is pyrogenic silica which is prepared in a flame reaction from organosilicon compounds, for example silica prepared from silicon tetrachloride, methyltrichlorosilane, hydrogen trichlorosilane, hydrogen methyldichlorosilane, or other methylchlorosilanes or alkylchlorosilanes, also as a mixture with hydrocarbons, or any desired volatilizable or sprayable mixtures of organosilicon compounds as mentioned, and hydrocarbons, for example in a hydrogen-oxygen flame or in a carbon monoxide-oxygen flame. The preparation of the silica can optionally be effected with or without further addition of water, for example in the purification step. Preferably, no water is added.

It is possible to use any desired mixtures of solids for the surface modification.

Preferably, the pyrogenic silica has a fractal dimension of the surface of less than or equal to 2.3, more preferably less than or equal to 2.1, and most preferably from 1.95 to 2.05, the fractal dimension of the surface $D_S$ being defined here as: particle surface A is proportional to the particle radius R to the power $D_S$.

Preferably, the silica has a fractal dimension of the mass $D_m$ of less than or equal to 2.8, more preferably less than or equal to 2.3, and most preferably from 1.7 to 2.1, as stated, for example, in F. Saint-Michel, F. Pignon, A. Magnin, *J. Colloid Interface Sci.* 2003, 267, 314. The fractal dimension of the mass $D_m$ is defined here as: particle mass M is proportional to the particle radius R to the power $D_m$.

Preferably, the unmodified silica has a density of surface silanol groups SiOH of less than 2.5 SiOH/nm², more preferably less than 2.1 SiOH/nm², yet more preferably less than 2 SiOH/nm², and most preferably from 1.7 to 1.9 SiOH/nm².

It is preferably also possible to use hydrophilic silicas which are freshly prepared and taken directly from the burner, temporarily stored or already packed in commercially available form.

Uncompacted silicas having bulk densities below 60 g/l, are preferably used, but compacted silicas having bulk densities above 60 g/l, can also be used.

Use of mixtures of different metal oxides or silicas is also preferable, for example mixtures of metal oxides or silicas of different BET surface area, or mixtures of metal oxides with different degrees of hydrophobicity or silylation.

The metal oxide is preferably prepared in continuous or batchwise processes, and the silylation process may be composed of one or more steps. Preferably, the silylated metal oxide is prepared by means of a process in which the preparation process is effected in separate steps: (A) initial preparation of the hydrophilic metal oxide, (B) optionally premodification of the metal oxide by means of known methods with silanes of the general formula IV or organopolysiloxanes, and then (C) the silylation/modification of the metal oxide with (1) loading of the hydrophilic or premodified metal oxide with silanes of the general formula II, (2) reaction of the metal oxide with the applied compounds and (3) purification of the metal oxide to remove excess applied compounds.

The surface treatment is preferably carried out in an atmosphere which does not lead to oxidation of the silylated metal oxide, i.e. preferably at less than 10% by volume of oxygen, more preferably less than 2.5% by volume, and most preferably less than 1% by volume of oxygen.

Coating, reaction and purification are preferably carried out as a batchwise or continuous process. For technical reasons, a continuous reaction procedure is preferred.

The coating (step C1) is preferably effected at temperatures of from 30 to 250° C., more preferably at from 20 to 150° C., yet more preferably at from 20 to 80° C.; and most preferably, the coating step is effected at from 30 to 50° C.

The residence time is preferably 1 min-24 h, more preferably from 15 min to 300 min, and for reasons relating to the space-time yield most preferably from 15 min to 240 min.

The pressure during coating preferably ranges from slightly reduced pressure up to 0.2 bar to a super-atmospheric pressure of 100 bar (gauge pressure), atmospheric pressure, i.e. a pressureless procedure relative to external/atmospheric pressure being preferred for technical reasons.

The silanes of the general formula II and optionally of the formula IV or organopolysiloxanes are preferably added in liquid form and in particular mixed with the pulverulent silica. The compounds can be admixed in pure form or as solutions with known industrially used solvents for example, alcohols such as, methanol, ethanol or isopropanol, ethers such as diethyl ether, THF or dioxane, or hydrocarbons such as hexanes or toluene. The concentration in the solution is 5-95% by weight, preferably 30 95% by weight, and most preferably 50-95% by weight.

The admixing is preferably effected by nozzle techniques or comparable techniques such as effective spraying techniques, for example spraying in 1 fluid nozzles under pressure (preferably from 5 to 20 bar), spraying in 2-fluid nozzles under pressure (preferably gas and liquid, 2-20 bar), or very fine division using atomizers or gas-solid exchange units with movable, rotating or static internals which permit homogeneous distribution of the silanes of the general formula II with the pulverulent silica.

The aerosol can preferably be sprayed from above onto the fluidized solid or into the fluidized solid; spraying from above onto the product is preferred.

Preferably the silanes of the general formula II are fed in as very finely divided aerosol, characterized in that the aerosol has a settling rate of 0.1-20 cm/s.

Preferably, the loading of the silica and the reaction with the silanes of the general formula II are effected with mechanical or gas-supported fluidization. The mechanical fluidization is particularly preferred.

A gas-supported fluidization is preferably effected by means of all inert gases which do not react with the silanes of the general formula II, the silica and the modified silica, i.e. do not lead to secondary reactions, degradation reactions, oxidation processes and flame and explosion phenomena, preferably, $N_2$, Ar, other noble gases, $CO_2$, etc. The gases for fluidization are preferably fed in at superficial gas velocities in the range from 0.05 to 5 cm/s, more preferably 0.5-2.5 cm/s. Particularly preferred is mechanical fluidization which is effected by means of paddle stirrers, anchor stirrers and other suitable stirring members, without additional use of gas over and above the blanketing.

In a particularly preferred embodiment, unreacted silanes of the general formula II and optionally of the formula IV or organopolysiloxanes and waste gases from the purification step are recycled to the step comprising coating and loading of the silica. Recycle can take place partly or completely, preferably to 10-90% of the total volume flow of the gas volumes emerging from the purification.

Recycling takes place in suitably thermostated apparatuses, and preferably takes place in the uncondensed phase, i.e. as gas or as vapor. Recycling can take place as mass transfer along a pressure equalization or as a controlled mass transfer with the technically customary systems of gas transport, such as fans, pumps, and compressed-air diaphragm pumps. Since the recycling of the uncondensed phase is preferred, heating of the recycling piping may be advisable.

The recycling of the unreacted silanes of the general formula II and optionally of the formula IV or organopolysiloxanes and of the waste gases is preferably from 5 to 100% by weight, based on the total mass thereof, more preferably from 30 to 80% by weight. The recycling may be from 1 to 200 parts, preferably from 10 to 30 parts, based on 100 parts of freshly used silane.

The recycling of the purification products of the modification reaction to the coating preferably takes place continuously.

The reaction (step C2) preferably takes place at temperatures of 20-300° C., more preferably 20-200° C. and most preferably at 40-180° C. The reaction is preferably effected in a temperature gradient, i.e. the reaction temperature increasing over the course of the reaction time. This means that the wall temperature of the reaction container is preferably in a range of 20-100° C., more preferably 40-80° C., at the beginning of the reaction, and is preferably in a range of 80-180° C., more preferably in a range of 100-150° C., toward the end of the reaction, with the proviso that the wall temperature of the reaction container at the beginning of the reaction is lower than toward the end of the reaction. Preferably, the wall temperature of the reaction container is therefore in a range of preferably 20-100° C. at the beginning of the reaction and in a range of 80-180° C. toward the end of the reaction, with the proviso that the wall temperature of the reaction container at the beginning of the reaction is lower than toward the end of the reaction; preferably, the wall temperature of the reaction container is in a range of 40-80° C. at the beginning of the reaction and in a range of 80-150° C. toward the end of the reaction.

The reactor wall temperature ensures that the product temperature is preferably in a range of 20-100° C., more preferably in a range of 40-80° C., at the beginning of the reaction and the product temperature is preferably in a range of 80-180° C., more preferably in a range of 100-150° C., toward the end of the reaction, with the proviso that the product temperature at the beginning of the reaction is lower than toward the end of the reaction. Preferably, the product temperature is therefore in a range of 20-100° C. at the beginning of the reaction and in a range of 80-180° C. toward the end of the reaction, with the proviso that the product temperature at the beginning of the reaction is lower than toward the end of the reaction. More preferably, the product temperature is in a range of 40-80° C. at the beginning of the reaction and in a range of 80-150° C. toward the end of the reaction.

Thus, depending on the manner in which the process is carried out, i.e. if the process is carried out continuously or batchwise, the temperature gradient may be dependent on the location dT/dx (continuous) or dependent on the time dT/dt (batchwise); the process is preferably carried out continuously.

The reaction temperature, i.e. the wall or product temperature, and the gradient thereof can be achieved, for example, by the following methods.

1. Continuous Course of the Process (i.e. dT/dx):

The metal oxide is preferably transported by means of gas-supported or mechanical fluidization/transport through a heating zone with increasing wall temperature. The wall temperature may increase continuously or in steps. In the case of a stepwise increase, the reaction zone can preferably consist of up to 10 separate heating zones of different temperature, preferably 5 separate heating zones of different temperature, yet more preferably 3 separate heating zones of different temperature, and in a specific embodiment, 2 separate heating zones of different temperature, i.e. temperature increasing from heating zone to heating zone. Optionally, the individual heating zones can be separated from one another by flaps. The reaction container may be vertical or horizontal. The vertical embodiment is preferred. In the case of a vertical embodiment, the metal oxide can pass through the reaction zone from bottom to top or from top to bottom. From top to bottom is preferred.

Or alternatively:

The metal oxide is preferably transported by means of gas-supported or mechanical fluidization/transport through separate reaction containers having a different, i.e. increasing wall temperature. The reaction cascade may consist of preferably up to 10 reaction containers of different wall temperature, more preferably up to 5 reaction containers of different wall temperature, yet more preferably up to 3 reaction containers of different wall temperature and in a specific embodiment, 2 reaction containers of different wall temperature, with the proviso that the wall temperature increases from reaction container to reaction container. The reaction containers may be vertical or horizontal. The vertical embodiment is preferred. In the case of the vertical embodiment, the metal oxide can pass through the reaction zone from bottom to top or from top to bottom. From top to bottom is preferred.

Or alternatively:

The metal oxide is preferably transported by means of mechanical fluidization/transport through a vertical reaction container. The reaction container is heated in the lower part to the maximum reaction temperature. A temperature gradient between the upper part of the reaction container (lowest temperature) and the lower part of the reaction container (highest temperature) is then established in the reaction container. The temperature gradient of the product temperature can be controlled, for example, by a suitable stirring technique with plug flow. This can preferably be achieved by a combination of different stirring elements which may be arranged in segments. Thus, for example, segments with horizontal mixing followed by segments with vertical mixing characteristic can be used.

2. Batchwise Course of Production (Batch Operation)

The metal oxide is preferably fluidized by means of inert gas or mechanical stirring in the reaction container. In the course of the reaction, the reaction temperature in the reaction container is gradually increased, i.e. in the form of a ramp or stepwise.

The residence time per reaction temperature is preferably from 5 min to 240 min, more preferably from 10 min to 180 min and most preferably from 15 min to 120 min.

The heating of the reaction zone can be effected, for example, via the container wall, for example by means of electrical heating or by means of thermostating liquid or vapor. If appropriate, for example, heating coils can be used in the reaction vessel. If appropriate, the heating can be effected from the outside via infrared radiators.

The temperature measurement of wall and product temperature can preferably be effected by means of measuring instruments usually used, such as thermocouples, resistance thermometers, bimetallic thermometers, IR sensors or others.

The total reaction time is preferably from 10 min to 48 h, more preferably from 15 min to 5 h, and most preferably from 20 min to 4 h.

If appropriate, protic organic solvents can be added, such as liquid or vaporizable alcohols. Typical alcohols are isopropanol, ethanol and methanol. It is also possible to add mixtures of the abovementioned protic organic solvents. Preferably, from 1 to 50% by weight of protic solvents, based on the silica, are added, more preferably from 5 to 25%. Preferably, the modification of the metal oxides is carried out in an anhydrous environment. This means that the content of physically adsorbed water of the hydrophilic metal oxides used or metal oxides modified with groups of the general formula III is less than 5% by weight, preferably less than 1.5% by weight and more preferably less than 0.5% by weight. Preferably, no water is added for the reaction of the metal oxides with silanes of the general formula II, and preferably, the process gases used are dried before being fed in. If appropriate, the metal oxides used for modification with silanes of the general formula II can be dried before the reaction.

If appropriate, basic catalysts, of basic character in the sense of a Lewis base or of a Brönsted base, such as ammonia or amines, such as triethylamine, can be added. These are preferably added in traces, i.e. less than 1000 ppm. Most preferably, no catalysts are added.

The purification (step C3) preferably takes place at a purification temperature of from 20 to 200° C., more preferably from 50° C. to 180° C., and most preferably from to 150° C. The purification step is preferably characterized by movement, slow movement and slight mixing being particularly preferred. The stirring members are advantageously adjusted and moved so that preferably mixing and fluidization, but not complete turbulence, occurs.

The purification step can furthermore preferably be characterized by increased introduction of gas, corresponding to a superficial gas velocity of preferably from 0.001 to 10 cm/s, more preferably from 0.01 to 1 cm/s. This can be effected by all inert gases which do not react with the silanes of the general formula II, the silica and the modified silica, i.e. do not lead to secondary reactions, degradation reactions, oxidation processes and flame and explosion phenomena, preferably, $N_2$, Ar, other noble gases, $CO_2$, etc.

Processes for mechanical compaction of the silica, such as press rolls, milling units such as edge mills ball mills, continuous or batchwise, compaction by screws or screw mixers, screw compacters, briquetters, or compaction by removal of the air or gas content by suction by suitable vacuum methods, are preferably used during the modification or after the purification.

Mechanical compaction during the modification is particularly preferred, characterized in step C by press rolls, abovementioned milling units, such as ball mills, or compaction by screws, screw mixers, screw compacters, or briquetters.

In a further particularly preferred procedure, processes for mechanical compaction of the silica, such as compaction by removal of the air or gas content by suction by suitable vacuum methods or press rolls or a combination of the two processes, are used after the purification.

In addition, in a particularly preferred procedure, processes for the deagglomeration of the silica, such as pinned-disk mills, hammer mills, countercurrent mills, impact mills or apparatuses for milling classification, can be used after the purification.

In a further preferred process, dispersions of the hydrophilic metal oxide in organic solvents typically used industrially, preferably, for example, alcohols such as methanol, ethanol, and isopropanol, ketones such as acetone and methyl ethyl ketone, ethers such as diethyl ether and THF, hydrocarbons such as pentane, hexanes, aromatics, for example toluene, and other volatile solvents, such as hexamethyldisiloxane, or mixtures thereof are reacted with the silanes of the general formula II.

The process can be carried out continuously or batchwise and may be composed of one or more steps. A continuous process is preferred. Preferably, the modified metal oxide is prepared by means of a process in which the metal oxide (1) is mixed into one of the abovementioned solvents, (2) is reacted with the silanes and (3) is freed from solvents, excess silanes and byproducts.

The dispersing (1), reaction (2), drying (3) and optionally subsequent reaction (4) are preferably carried out in an atmosphere comprising less than 10% by volume of oxygen, more preferably less than 2.5% by volume; best results are obtained at less than 1% by volume of oxygen. The mixing (1) can preferably be effected by means of customary mixing units, such as anchor stirrers or bar-type stirrers. Optionally, mixing in can be effected with a high degree of shearing by means of dissolvers, rotor-stator units, optionally direct metering into the shear gap, by means of ultrasound generators or by means of milling units, such as ball mills. Optionally, various units from among the abovementioned ones can be used simultaneously or in succession. For the reaction (2) of the silanes having the general formula II with the metal oxide, the silanes are preferably added in pure form or as a solution in suitable solvents to the metal oxide dispersion and homogeneously mixed. The addition of the silanes is preferably effected in the container which is used for the preparation of the dispersion or in a separate reaction container. If the silanes are fed in the dispersing container, feeding can be simultaneous with or after the end of dispersing. Optionally, the silanes can be added in solution in the dispersing medium directly in the dispersing step.

Optionally, acidic catalysts, such as Brönsted acids such as liquid or gaseous HCl, sulfuric acid, phosphoric acid or acetic acid, or basic catalysts such as Brönsted bases, such as liquid or gaseous ammonia, amines, such as NEt3 or NaOH, are added to the reaction mixture.

The reaction step is preferably carried out at a temperature of from 0° C. to 200° C., more preferably at from 10° C. to 180° C. and most preferably from 20° C. to 150° C.

The removal of solvents, excess silanes and byproducts (3) can preferably be effected by means of dryers or by spray drying. Optionally, the drying step can also be followed by a subsequent reaction step (4) for completing the reaction. The subsequent reaction preferably takes place at temperatures of 20-300° C., more preferably 20-200° C. and most preferably at 40-180° C.

The subsequent reaction is preferably effected in a temperature gradient, i.e. the reaction temperature increases over the course of the reaction time, as already described above for the case of the modification of the metal oxide as a solid. The overall reaction time for the subsequent reaction is preferably from 10 min to 48 h, more preferably from 15 min to 5 h, and most preferably from 20 min to 4 h.

In addition, processes for mechanical compaction of the metal oxide, for example press rolls, milling units such as edge mills and ball mills, continuous or batchwise, compaction by screws or screw mixers, screw compacters, briquetters, or compaction by removal of the air or gas content by suction by suitable vacuum methods, are preferably used after the drying or subsequent reaction.

In a further particularly preferred procedure, processes for mechanical compaction of the metal oxide such as compaction by removal of the air or gas content by suction by suitable vacuum methods or press rolls or combination of the two processes, are used after the drying or subsequent reaction.

In addition, in a particularly preferred procedure, processes for deagglomeration of the metal oxide, such as pinned-disk mills, hammer mills, countercurrent mills, impact mills or apparatuses for milling/classification, can be used after the drying or subsequent reaction.

The silanes of the general formula II are preferably used in an amount of from 1% by weight to 20% by weight (based on the metal oxide), preferably in an amount of from 2.0% by weight to 15% by weight and more preferably in an amount of from 2.5% by weight to 10% by weight per hydrophilic metal oxide surface area of 100 $m^2/g$ BET surface area used (measured by the BET method according to DIN EN ISO 9277/DIN 66132).

Preferably, a silica having a homogeneously modified surface, having a mean primary particle size of less than 100 nm, more preferably having a mean primary particle size of from 5 to 50 nm, is prepared, these primary particles not existing in isolation in the silica but being part of larger aggregates (definition according to DIN 53206) which have a diameter of from 50 to 1000 nm, preferably from 50 to 500 nm and more preferably from 75 to 350 nm, and build up agglomerates (definition according to DIN 53206) which, depending on the external shear load, have sizes of from 1 to 1000 µm, the silica having a specific surface area of from 10 to 400 $m^2/g$ (measured by the BET method according to DIN 66131 and 66132), the silica having a fractal dimension of the mass Dm of less than or equal to 2.8, preferably less than or equal to 2.3, more preferably of from 1.7 to 2.1, as given, for example, in F. Saint-Michel, F. Pignon, A. Magnin, J. Colloid Interface Sci. 2003, 267, 314.

Preferably, the silica surface is chemically permanently modified with groups of the general formula I or I and III. A suitable method for rating the permanence of a modification is the quantitative determination of extractable silane, i.e. silane not chemically bound to the silica surface. The silicas according to the invention are distinguished in that they preferably have less than 5% by weight, more preferably less than 2% by weight, and most preferably less than 1% by weight of extractables, and no extractables can be detected in a specific embodiment.

Preferably, the modified metal oxide surface also has $T^2$ and optionally $T^1$ groups in addition to $T^3$ groups.

Preferably, the proportion of the sum of the NMR signal intensities of the $T^1$ and $T^2$ groups, based on the total intensity of the T groups $T^1+T^2+T^3$, is at least 20%, more preferably greater than or equal to 25%, yet more preferably greater than or equal to 30% and, in a specific embodiment, greater than or equal to 35% of the total intensity of the T groups $T^1+T^2+T^3$.

The relative proportion of the $T^1$, $T^2$ and $T^3$ groups can be determined by solid-state NMR spectroscopy in the $^{29}$Si—CPMAS mode. In this procedure, the relative area fraction F of the individual peaks is determined from the individual peak areas (PA) of the corresponding individual signals for the $T^1$, $T^2$ and $T^3$ groups relative to the total peak area of the T groups, i.e. for example $$A(T^1)=c=PA(T^1)/PA(T^1)+PA(T^2)+PA(T^3),$$

the individual peak areas (PA) being accessible by peak deconvolution of the total peak of the corresponding group signal by means of Gaussian fit.

An analogous procedure is adopted for the other abovementioned groups.

The chemical shift of the individual organic silicon groups in the $^{29}$Si—NMR spectrum is, for example, given in D. W. Sindorf, G. E. Maciel, *Journal of the American Chemical Society* 1983, 105, 3767.

Preferably, the metal oxides according to the invention have a carbon content of from 1% by weight to 20% by weight, more preferably from 1% by weight to 15% by weight, and most preferably from 1% by weight to 10% by weight.

Furthermore, the metal oxides according to the invention are characterized in that they preferably have a high positive triboelectric surface charge $q_{trib}$ of from +50 µC/g to +1000 µC/g, more preferably from +75 µC/g to +750 µC/g and most preferably from +100 µC/g to +500 µC/g.

Furthermore, the metal oxides according to the invention are characterized in that the positive triboelectric surface charge has an excellent process stability. This means that the relative decrease in the triboelectric surface charge ($q_{trib}(3600)-q_{trib}(150))\times100\%/q_{trib}(150)$ is not more than 60%, preferably not more than 55% and more preferably not more than 50%, $q_{trib}(3600)$ being the triboelectric surface charge after an activation time of 3600 s and $q_{trib}(150)$ being the triboelectric surface charge after an activation time of 150 s of a mixture of a toner powder and the metal oxide according to the invention, it being necessary for $q_{trib}(150)$ to be greater than 0.

Furthermore, the metal oxides according to the invention are characterized in that the positive triboelectric surface charge has an excellent stability to high atmospheric humidity and temperatures. This means that the relative decrease in the triboelectric surface charge ($q_{trib}(3600)-q_{trib}(150))\times100\%/q_{trib}(150)$ is not more than 60%, preferably not more than 55% and more preferably not more than 50%, $q_{trib}(3600)$ being the triboelectric surface charge after an activation time of 3600 s and $q_{trib}(150)$ being the triboelectric surface charge after an activation time of 150 s of a mixture of a toner powder and the metal oxide according to the invention and it being necessary for $q_{trib}(150)$ to be greater than 0, the mixture having been stored at 32° C. and 80% relative humidity for 5 d prior to the measurement.

The metal oxides according to the invention preferably have a median agglomerate size $D_{50}$ of less than 50 µm, more preferably less than 25 µm, yet more preferably less than 20 µm, and most preferably less than 15 µm after deagglomeration, for example by means of a classifier mill or pinned-disk mill.

The metal oxides according to the invention furthermore have a narrow particle size distribution of the agglomerates after deagglomeration, for example by means of a classifier mill or pinned-disk mill. This means that the quotient of the $D_{95}$ value and the $D_{50}$ value is preferably less than 3.0, more preferably less than or equal to 2.5 and most preferably less than or equal to 2.0.

The particle size of the agglomerates is determined by means of Fraunhofer laser diffraction on an ultrasound-treated dispersion of the metal oxide particles in isopropanol.

The metal oxides according to the invention are furthermore characterized in that, in pulverulent systems, they prevent caking or formation of lumps, for example under the influence of moisture, but also have no tendency to reagglomeration and therefore to undesired separation, but keep powders flowable and thus give load-stable and storage-stable mixtures. This is true in particular for the use in nonmagnetic and magnetic toners and developers and charge control auxiliaries, for example in noncontact or electrophotographic printing/reproduction processes, which may be 1- and 2-component systems. This means that the flowability of a mixture comprising a toner powder and the metal oxide according to the invention, after an activation time of 150 s, is at least a factor of 1.1 better than an analogously treated blank sample of the toner powder without silica according to the invention; preferably, the flowability is a factor of 1.2 better and more preferably the flowability is a factor of 1.3 better, the flowability being determined by means of a Q/m-mono measuring apparatus from Epping GmbH, D-85375 Neufahrn, by differential weighing after the abovementioned activation time.

This is also true in pulverulent resins which are used as coating systems.

The invention furthermore relates to the use of the metal oxides according to the invention in systems of low to high polarity as a viscosity-imparting component. This relates to all solvent-free, solvent-containing, film-forming coating materials, rubber-like to hard coatings, adhesives, sealing and potting compounds and other comparable systems.

The metal oxides according to the invention can be used in systems such as:
epoxide systems
polyurethane systems (PU)
vinyl ester resins
unsaturated polyester resins
resin systems having a low solvent content, so-called high solids
solvent-free resins which are applied in powder form, for example as coating materials.

The metal oxides according to the invention, as a rheological additive in these systems, give the required necessary viscosity, structural viscosity, thixotropic properties and a flow limit sufficient for non-sag properties on perpendicular surfaces.

The metal oxides according to the invention can be used in particular as a rheological additive and reinforcing filler in uncrosslinked and crosslinked silicone systems such as silicone elastomers which are composed of silicone polymers such as polydimethylsiloxanes, fillers and further additives. These may be crosslinked, for example, with peroxides, or crosslinked via addition reactions, a so-called hydrosilylation reaction, between olefinic groups and Si—H groups, or via condensation reactions between silanol groups, for example those which form under the influence of water.

The metal oxides according to the invention can furthermore be used in particular as a reinforcing filler in solvent-based, solvent-free and water-based coatings, adhesives, sealing and potting compounds and other comparable systems for improving the mechanical properties of the cured system. Owing to the specific properties of the metal oxides according to the invention, high degrees of filling with metal oxides in the uncured systems can be realized without the viscosity increasing excessively.

The invention furthermore relates to toners, developers and charge control auxiliaries which contain the metal oxides according to the invention. Such developers and toners are, for example, magnetic 1-component and 2 component toners, but also nonmagnetic toners. These toners may consist of resins such as styrene and acrylic resins, and are preferably milled to particle distributions of 1-100 μm, or resins which were prepared in polymerization processes in dispersion or emulsion or solution or as such preferably to give particle distributions of 1-100 μm. The silicas according to the invention are preferably used for improving and controlling the powder flow behavior and/or for regulating and controlling the triboelectric charge properties of the toner or developer. Such toners and developers can preferably be used in electrophotographic printing processes and they can also be employed in direct image transfer processes.

A toner typically has the following composition

Solid resin as a binder, which is sufficiently hard to prepare a powder therefrom, preferably having a molecular weight of more than 10,000, preferably having a proportion of polymers with a molecular weight below 10,000 of less than 10%, for example a polyester resin which may be a cocondensate of diol and carboxylic acid, carboxylic ester or carboxylic anhydride, for example having an acid number of 1-1000, preferably 5-200, or may be a polyacrylate or a polystyrene or mixtures or copolymers thereof, and having a median particle diameter of less than 20 μm, preferably less than 15 μm, and more preferably less than 10 μm.

The toner resin may contain

Alcohols, carboxylic acids and polycarboxylic acid

Industrially customary dyes, such as black carbon black, color black, cyan dyes, magenta dyes, yellow dyes Typically positive charge control agents, such as charge control additives, for example of the nigrosine dye type, or triphenylmethane dyes substituted by tertiary amines, or quaternary ammonium salts, such as CTAB (cetyltrimethylammonium bromide=hexadecyltrimethylammonium bromide), or polyamines, typically less than 5% by weight Alternatively, negative charge control agents, such as charge control additives, such as metal-containing azo dyes, or copper phthalocyanine dyes, or metal complexes, for example of alkylated salicylic acid derivatives or benzoic acid, in particular with boron or aluminum, in the required amounts, typically less than 5% by weight.

For the preparation of magnetic toners, magnetic powders can optionally be added, such as, for example, powders which can be magnetized in a magnetic field, such as ferromagnetic substances, such as iron, cobalt, nickel, alloys, or compounds, such as magnetite, hermatite or ferrite.

Alternatively, it is also possible to add developers, such as iron powder, glass powder, nickel powder, or ferrite powder.

Metal oxides according to the invention preferably in contents, based on a solid resin as binder having a median particle diameter of 20 μm of greater than 0.01% by weight, and more preferably greater than 0.1% by weight. With decreasing median particle diameter of the binder, generally higher contents of metal oxide are required, the required amount of metal oxide increasing in inverse proportion to the particle diameter of the binder. The content of metal oxide is, however, preferably less than 5% by weight, based on binder resin, in each case.

Further inorganic additives, such as finely divided and coarse-particle silicon dioxides, including those preferably having a median diameter of from 100 to 1000 nm, aluminum oxides, such as pyrogenic aluminum oxides, titanium dioxides, such as pyrogenic titanium dioxides, or anatase or rutile, zirconium oxides, may be present.

Waxes, such as paraffinic waxes having 10-500 C atoms, silicone waxes, olefinic waxes, waxes having an iodine number of less than 50, preferably less than 25, and preferably a saponification number of 10-1000, more preferably 25-300, may be present.

The toner can be used in various development processes, such as for electrophotographic image production and reproduction, such as, for example, magnetic brush methods, cascade methods, use of conductive and nonconductive magnetic systems, powder cloud methods, development in print, etc.

All above symbols of the above formulae have their meanings in each case independently of one another.

EXAMPLES

Example 1

At a temperature of 25° C. under inert gas $N_2$, 12 g of cyclohexylaminopropyltrimethoxysilane are added to 100 g of a hydrophobic SILICA modified with dimethylsilyloxy groups, having a moisture content of less than 0.5%, a carbon content of about 2% and a degree of modification of about 50% and having a specific surface area of the starting silica of 300 $m^2$/g (measured by the BET method according to DIN EN ISO 9277/DIN 66132) (available under the name HDK® H30 from Wacker Chemie AG, Munich, Germany) by spraying via a one-fluid nozzle (pressure 5 bar). The SILICA laden in this manner is further fluidized by means of stirring with a residence time of 0.25 hour at a temperature of 25° C. and then reacted in a 100 l drying oven under $N_2$ for 1 h at 80° C. and 2 h at 150° C.

The analytical data are shown in table 1.

Example 2

Comparative Example; not According to the Invention

At a temperature of 25° C. under inert gas $N_2$, 5 g of water and then 12 g of cyclohexylaminopropyltrimethoxysilane are added to 100 g of a hydrophobic SILICA modified with dimethylsilyloxy groups, having a moisture content of less than 0.5%, a carbon content of about 2% and a degree of modification of about 50% and having a specific surface area of the starting silica of 300 $m^2$/g (measured by the BET method according to DIN EN ISO 9277/DIN 66132) (available under the name WACKER HDK® H30 from Wacker Chemie AG, Munich, Germany) by spraying via a one-fluid nozzle (pressure 5 bar). The SILICA laden in this manner is further fluidized by means of stirring with a residence time of 0.25 hour at a temperature of 25° C. and then reacted in a 100 l drying oven under $N_2$ for 1 h at 80° C. and 2 h at 150° C. The analytical data are shown in table 1.

Example 3

At a temperature of 25° C. under inert gas $N_2$, 6 g of cyclohexylaminopropyltrimethoxysilane are added to 100 g of a hydrophobic SILICA modified with dimethylsilyloxy groups, having a moisture content of less than 0.5%, a carbon content of about 1% and a degree of modification of about 50% and having a specific surface area of the starting silica of 150 $m^2/g$ (measured by the BET method according to DIN EN ISO 9277/DIN 66132) (available under the name HDK® H15 from Wacker Chemie AG, Munich, Germany) by spraying via a one-fluid nozzle (pressure 5 bar). The SILICA laden in this manner is further fluidized by means of stirring with a residence time of 0.25 hour at a temperature of 25° C. and then reacted in a 100 l drying oven under $N_2$ for 1 h at 80° C. and 2 h at 150° C.

The analytical data are shown in table 1.

Example 4

At a temperature of 25° C. under inert gas $N_2$, 16 g of aminopropyltrimethoxysilane are added to 100 g of a hydrophilic SILICA having a moisture content of less than 0.5% and having a specific surface area of 300 $m^2/g$ (measured by the BET method according to DIN EN ISO 9277/DIN 66132) (available under the name HDK® T30 from Wacker Chemie AG, Munich, Germany) by spraying via a one-fluid nozzle (pressure 5 bar). The SILICA laden in this manner is further fluidized by means of stirring with a residence time of 0.25 hour at a temperature of 25° C. and then reacted in a 100 l drying oven under $N_2$ for 1 h at 80° C. and for 2 h at 150° C.

The analytical data are shown in table 1.

Example 5

Comparative Example; not According to the Invention

At a temperature of 25° C. under inert gas $N_2$, 5 g of water and then 16 g of aminopropyltrimethoxysilane are added to 100 g of a hydrophilic SILICA having a moisture content of less than 0.5% and having a specific surface area of 300 $m^2/g$ (measured by the BET method according to DIN EN ISO 9277/DIN 66132) (available under the name HDK® T30 from Wacker Chemie AG, Munich, Germany) by spraying via a one-fluid nozzle (pressure 5 bar). The SILICA laden in this manner is further fluidized by means of stirring with a residence time of 0.25 hour at a temperature of 25° C. and then reacted in a 100 l drying oven under $N_2$ for 1 h at 80° C. and for 2 h at 150° C.

The analytical data are shown in table 1.

Example 6

800 ml of hexamethyldisiloxane are initially introduced into 2 l of a three-necked flask under argon as inert gas and then 50 g of a hydrophobic SILICA modified with dimethylsilyloxy groups, having a moisture content of less than 0.5%, a carbon content of about 2% and a degree of modification of about 50% and having a specific surface area of the starting silica of 300 $m^2/g$ (measured by the BET method according to DIN EN ISO 9277/DIN 66132) (available under the name HDK® H30 from Wacker Chemie AG, Munich, Germany) are added to 6 g of cyclohexylaminopropyltrimethoxysilane. The suspension is heated under reflux for 2 h and, after cooling to room temperature, the solvent is removed at reduced pressure. Thereafter, the pulverulent residue is reacted with a total residence time of 3 hours for 1 h at 100° C. and then for 2 h at 150° C. in a 100 l drying oven under $N_2$.

The analytical data are shown in table 1.

Example 7

In a continuous plant, 15 kg/h of a hydrophobic SILICA modified with diemthylsilyloxy groups, having a moisture content of less than 0.5%, a carbon content of about 2% and a degree of modification of about 50% and having a specific surface area of the starting silica of 300 $m^2/g$ (measured by the BET method according to DIN EN ISO 9277/DIN 66132) (available under the name HDK® H30 from Wacker Chemie AG, Munich, Germany) are mixed with 1.8 kg/h of cyclohexylaminopropyltrimethoxysilane at a temperature of 50° C. under inert gas $N_2$ by spraying via a two-fluid nozzle. The SILICA laden in this manner is transported by a reactor having an entry temperature of 50° C. and an end temperature of 80° C. and reacted thereby. The residence time in the temperature gradient field is about 2 h. The silica is then dried in a dryer at 120° C.

The analytical data are shown in table 1.

| Example | % C | A (T1 + T2)*) % | $q_{trib}$ µC/g | $\Delta q_{rel}$/% | Extractable % |
|---|---|---|---|---|---|
| 1 | 7.4 | 37.0 | +196 | 34 | less than 0.05 |
| 2 | 6.9 | 0.0 | −472 | neg. | less than 0.05 |
| 3 | 2.7 | 42.1 | +194 | 29 | less than 0.05 |
| 4 | 4.6 | 66.7 | +94 | 49 | less than 0.05 |
| 5 | 4.3 | 5.3 | −100 | neg. | less than 0.05 |
| 6 | 6.0 | 60.8 | +336 | 15 | 0.2 |
| 7 | 6.4 | 45.5 | +372 | 20 | less than 0.05 |

*)Measured in the CPMAS mode

Description of the Analytical Methods
1. Carbon Content (% C)
    Elemental analysis for carbon; combustion of the sample at above 1000° C. in an $O_2$ stream, detection and quantification of the $CO_2$ forming by means of IR; LECO 244 apparatus
2. Triboelectric Charge $q_{trib}$ (µC/g)
    1% of silica is added to uncoated iron powder ($d_{50}$=172 µm) and mixed in a PE bottle by shaking 50 times. Thereafter, the PE bottle is placed for 5 minutes on an activation unit or a roller stand (from Epping). For the measurement, a defined amount of the Fe powder/silica mixture is introduced into the highly insulated metal cell of a q/m meter (from EPPING GmbH, D-85375 Neufahrn bei Freising) and measured, the following parameters having been used:
    sieve material: stainless steel
    sieve mesh size top and bottom: 45 µm
    compressed air: 2.4 bar; 1 liter/minute
    vacuum: less than 900 mbar
3. Relative Decrease in the Triboelectric Surface Charge $\Delta q_{rel}$
    $\Delta q_{rel} = (q_{trib}(3600) - q_{trib}(150)) \times 100\%/q_{trib}(150)$    $q_{trib}(3600)$ being the triboelectric surface charge after an activation time of 3600 s and $q_{trib}(150)$ being the triboelectric surface charge after an activation time of 150 s of a mixture of a toner powder and the metal oxide according to the invention and it being necessary for $q_{trib}(150)$ to be greater than 0. For the measurement, 0.8% of silica is added to a commercially available 1-component toner (magnetic; polystyrene acrylate; d50=14.2 μm) and mixed for 2 hours in a Turbula (from Willy A. Bachofen AG Maschinenfabrik, CH-4058 Basel) at 20 rpm. A defined amount of the toner/silica mixture is applied to the activation roll of a Q/m-mono measuring apparatus (from EPPING GmbH, D-85375 Neufahrn bei Freising), and the triboelectric charge is measured after the 150 s and 3600 s activation times. The following measuring conditions are applicable:

measuring cells spacing: 0.3 mm
air flow: 100 ml/min
measuring time 15 sec.

4. Extractables 25 g of silica are incorporated by means of a spatula into 100 g of THF and then stirred, while cooling with ice, by means of the Dispermat CA-40-C dissolver (from Getzmann) having a 40 mm toothed disk until a fluid consistency is obtained, then sheared for 60 s at 8400 rpm, then equilibrated for 60 min by means of ultrasound, and a clear filtrate is separated off after 2 days by means of pressure filtration. The filtrate is investigated with regard to the silicon content by means of atomic absorption spectroscopy (AAS). Limit of detection less than 100 ppm organosilicon compounds, based on silica.

The invention claimed is:

1. A composition, comprising:
a modified pyrogenic silica capable of developing a positive triboelectric surface charge, and containing groups of the formula (I)

$$-O_{1+n}-Si(OR^1)_{2-n}-R^2-NR^3_2 \quad (I)$$

said modified pyrogenic silica prepared by a process comprising,
in a first step,
reacting a pyrogenic silica with at least one reactive hydrophobing agent to prepare a pre-hydrophobicized pyrogenic silica having hydrophobic groups of the formula $$R^5{}_a SiR^6{}_b O_c- \quad (III)$$

to a degree of modification by hydrophobic groups of the formula (III) in the range of about 20% to 75%, reacting taking place in a temperature gradient in the range from 20° C. to 350° C., the temperature at the beginning of reacting being in a first range of 20-180° C. and the temperature toward the end of reacting being in a second range of 120-350° C., the temperature in the second range being higher than in the first range, and purifying the modified metal oxide by removing unreacted hydrophobing agents, to form pre-hydrophobicized pyrogenic silica; and
in a second step,
reacting the pre-hydrophobicized pyrogenic silica obtained in the first step with an organosilane of the formula II $$X_{1+n}Si(OR^1)_{2-n}-R^2-NR^3_2 \quad (II)$$

wherein the first and second steps are performed in an anhydrous environment without the addition of catalysts, wherein the modified pyrogenic silica capable of developing a positive triboelectric surface charge contains less than 1 weight percent extractables based on the weight of the modified pyrogenic silica capable of developing a positive triboelectric surface charge, the positive triboelectric surface charge ($q_{trib}$(3600)−$q_{trib}$(150))×100%/$q_{trib}$(150) not decreasing by not more than 60%, $q_{trib}$(3600) being the triboelectric surface charge after an activation time of 3600 s and $q_{trib}$(150) being the triboelectric surface charge after an activation time of 150 s of a mixture of a toner powder and the modified metal oxide, it being necessary for $q_{trib}$(150) to be greater than 0;
wherein the modified pyrogenic silica capable of having a positive triboelectric surface charge bears $T^1$, $T^2$, and $T^3$ groups, wherein the proportion of the sum of the NMR signal intensities of $T^1$ and $T^2$ groups on the modified metal oxide, based on the total intensity of T groups $T^1+T^2+T^3$ is at least 20%, the T groups being defined as $T^1$: R—Si(OR$^1$)$_2$—O—Si $T^2$: R—Si(OR$^1$)(—O—Si)$_2$ and $T^3$: R—Si(—O—Si)$_3$;

wherein R is an organic group, and
wherein
n is 0, 1, or 2,
$R^1$ is a hydrogen atom or a C—O-bonded $C_1$-$C_{15}$-hydrocarbon radical, or an acetyl radical,
$R^2$ is an Si—C-bonded $C_1$-$C_{20}$-hydrocarbon radical or an aryl radical, or a $C_1$-$C_{15}$-hydrocarbonoxy radical in which in each case one or more, non-adjacent methylene units are optionally replaced by groups —O—, —CO—, —COO—, —OCO— or —OCOO—, —S— or —NR$^3$— and in which one or more non-adjacent methine units are optionally replaced by groups —N= or —P=,
$R^3$ is a hydrogen atom or an optionally mono- or polyunsaturated N—C-bonded, monovalent, optionally divalent, $C_1$-$C_{20}$-hydrocarbon radical optionally substituted by —CN, —NCO, —NR$^4{}_2$, —COOH, —COOR$^4$, -halogen, -acryloyl, -epoxy, —SH, —OH or —CONR$^4{}_2$, or an aryl radical, or a $C_1$-$C_{15}$-hydrocarbonoxy radical in which in each case one or more, non-adjacent methylene units are optionally replaced by groups —O—, —CO—, —COO—, —OCO— or —OCOO—, —S— or —NR$^4$— and in which one or more, non-adjacent methine units are optionally replaced by groups —N=, —N=N— or —P=, it being possible for R$^3$ to be identical or different or for the amine group —N(R$^3$)$_2$ also to be part of an aliphatic or aromatic heterocycle,
$R^4$ has the same meaning as $R^1$, and $R^4$ independently are identical or different,
a is 1, 2, or 3,
b is 0, 1, or 2,
c is 1, 2, or 3,
the sum of (a+b+c) is 4,
$R^5$ is a monovalent optionally mono- or poly-unsaturated, optionally branched $C_{1-24}$ hydrocarbon radical,
$R^6$ is a monovalent optionally mono- or poly-unsaturated, optionally branched $C_{1-20}$ hydrocarbon radical, and
X is halogen, a nitrogen radical, —OR$^4$, —O—C(O)R$^4$, or —O(CH$_2$)$_x$OR$^4$, wherein x is 1, 2, or 3.

2. The composition of claim 1, wherein the hydrophobic groups of the formula (III) are provided by reacting the pyrogenic silica with an organosilane hydrophobing agent of the formula IV $$R^5{}_a SiR^6{}_b X_c \quad (IV)$$

wherein X is halogen, a nitrogen radical, —OR$^4$, —O—C(O) R$^4$, or —O(CH$_2$)$_x$OR$^4$, wherein x is 1, 2, or 3.

3. The composition of claim 1, wherein the hydrophobic groups of the formula III are provided by reacting the pyrogenic silica with an organosiloxane containing two or more units of the formula (R$^5{}_3$SiO$_{1/2}$), (R$^5{}_2$SiO$_{2/2}$), and (R$^5$SiO$_{3/2}$).

4. The composition of claim 3, wherein the organosiloxane(s) are linear or cyclic polydialkylsiloxanes.

5. The composition of claim 4, wherein the cyclic or linear polydialkylsiloxanes are polydimethylsiloxanes.

6. The composition of claim 5, wherein the polydimethylsiloxanes are linear polydimethylsiloxanes having terminal groups selected from the group consisting of trimethylsilyloxy, dimethylhydroxysilyloxy, dimethylchlorosilyloxy, methyldichlorosilyloxy, dimethylmethoxysilyloxy, methyldimethoxysilyloxy, dimethyl-ethoxysilyloxy, methyldiethoxysilyloxy, dimethylacetoxysilyloxy, methyldiacetoxysilyloxy, dimethylhydroxysilyloxy groups, and mixtures thereof.

7. The composition of claim 4, wherein at least one organosiloxane is a liquid silicone resin having a 25° C. viscosity of 500 to 5000 mm²/s, wherein when the viscosity is greater than 1000 mm²/s, the silicone resin is dissolved in organic solvent to provide a solution viscosity of 1000 mm²/s or less.

8. The composition of claim 4 wherein at least one organosiloxane is a solid silicone resin dissolved in organic solvent to provide a solution viscosity of 1000 mm²/g or less.

9. The composition of claim 1, wherein the hydrophobic groups of the formula (III) are provided by reacting the pyrogenic silica with an organosilane hydrophobing agent of the formula IV $$R^5_a SiR^6_b X_c \qquad (IV)$$

wherein X is halogen, a nitrogen radical, —OR⁴, —O—C(O)R⁴, or —O(CH₂)ₓOR⁴, wherein x is 1, 2, or 3, and with an organosiloxane containing two or more units of the formula $$(R^5_3 SiO_{1/2}),$$

$$(R^5_2 SiO_{2/2}), \text{ and}$$

$$(R^5 SiO_{3/2}).$$

10. The composition of claim 1, wherein the triboelectric surface charge decreases by not more than 50%.

11. The composition of claim 1, wherein the positive triboelectric surface charge is from 50 μC/g to 1000 μC/g.

12. The composition of claim 1, wherein the positive triboelectric surface charge is from 75 μC/g to 750 μC/g.

13. The composition of claim 1, wherein the positive triboelectric surface charge is from 100 μC/g to 500 μC/g.

14. The composition of claim 1 which is a toner, developer, powder coat or charge control auxiliary.

15. A pulverulent coating material, comprising a composition of claim 1.

* * * * *